US010899979B2

(12) United States Patent
Fickel et al.

(10) Patent No.: US 10,899,979 B2
(45) Date of Patent: Jan. 26, 2021

(54) LIGHT OLEFIN PRODUCTION VIA AN INTEGRATED STEAM CRACKING AND HYDROCRACKING PROCESS

(71) Applicant: Sabic Global Technologies, B.V., Bergen op Zoom (NL)

(72) Inventors: Dustin Fickel, Sugar Land, TX (US); Travis Conant, Sugar Land, TX (US); Raul Velasco Pelaez, Sugar Land, TX (US); Kaushik Anil Gandhi, Sugar Land, TX (US)

(73) Assignee: Sabic Global Technologies, B.V., Bergen op Zoom (NL)

( * ) Notice: Subject to any disclaimer, the term of this patent is extended or adjusted under 35 U.S.C. 154(b) by 0 days.

(21) Appl. No.: 16/638,896

(22) PCT Filed: Aug. 14, 2018

(86) PCT No.: PCT/US2018/046630
§ 371 (c)(1),
(2) Date: Feb. 13, 2020

(87) PCT Pub. No.: WO2019/036426
PCT Pub. Date: Feb. 21, 2019

(65) Prior Publication Data
US 2020/0385642 A1 Dec. 10, 2020

Related U.S. Application Data

(60) Provisional application No. 62/545,643, filed on Aug. 15, 2017.

(51) Int. Cl.
*C10G 69/06* (2006.01)
*C10G 9/36* (2006.01)
*C10G 47/18* (2006.01)

(52) U.S. Cl.
CPC ............... *C10G 69/06* (2013.01); *C10G 9/36* (2013.01); *C10G 47/18* (2013.01);
(Continued)

(58) Field of Classification Search
CPC .......... C10G 69/06; C10G 47/18; C10G 9/36; C10G 2300/4012; C10G 2300/4018;
(Continued)

(56) References Cited

U.S. PATENT DOCUMENTS 3,702,292 A * 11/1972 Burich .................... C10G 9/005
208/80
3,839,484 A 10/1974 Zimmerman, Jr. et al.
(Continued)

FOREIGN PATENT DOCUMENTS

CN 105452423 A 3/2016
CN 105555925 A 5/2016
(Continued)

OTHER PUBLICATIONS

Foreign communication from a related application—First Office Action of Chinese Patent Application No. 2018800524982 dated Sep. 2, 2020, with English translation, 24 pages.
(Continued)

*Primary Examiner* — Randy Boyer
*Assistant Examiner* — Juan C Valencia
(74) *Attorney, Agent, or Firm* — Rodney B. Carroll; Conley Rose, P.C.

(57) ABSTRACT

A process for producing olefins comprising introducing a steam cracker feed to a liquid steam cracker furnace section to produce a steam cracker product comprising olefins, and wherein an amount of olefins in the steam cracker product is greater than in the steam cracker feed; separating the steam cracker product in a separation unit into a hydrogen stream, a methane stream, an olefin gas stream (ethylene and pro-
(Continued)

pylene), a saturated gas stream (ethane and propane), a hydrocarbons gas stream ($C_{4-5}$ hydrocarbons), an aromatics stream ($C_{6-8}$ aromatic hydrocarbons), a raffinate stream ($C_{6-8}$ non-aromatic hydrocarbons), and a heavies stream ($C_{9+}$ hydrocarbons); feeding the hydrocarbons gas stream and hydrogen to one or more hydroprocessing reactors to produce a hydrocracking product comprising ethane and propane; and recycling the hydrocracking product and the saturated gas stream to the liquid steam cracker furnace section.

20 Claims, 3 Drawing Sheets

(52) U.S. Cl.
CPC ............... *C10G 2300/4006* (2013.01); *C10G 2300/4012* (2013.01); *C10G 2300/4018* (2013.01); *C10G 2300/4025* (2013.01); *C10G 2300/4081* (2013.01); *C10G 2400/20* (2013.01)

(58) Field of Classification Search
CPC ........ C10G 2400/20; C10G 2300/4081; C10G 2300/4025; C10G 2300/4006
See application file for complete search history.

(56) References Cited

U.S. PATENT DOCUMENTS

| | | |
|---|---|---|
| 3,907,920 A | 9/1975 | Starks |
| 4,137,147 A | 1/1979 | Franck et al. |
| 6,190,533 B1 | 2/2001 | Bradow et al. |
| 6,210,561 B1 | 4/2001 | Bradow et al. |
| 9,279,088 B2 * | 3/2016 | Shafi ................... C10G 19/00 |
| 2006/0287561 A1 | 12/2006 | Choi et al. |
| 2013/0197283 A1* | 8/2013 | Shafi .................... C10G 9/16 585/251 |
| 2013/0233767 A1 | 9/2013 | Shafi et al. |
| 2015/0284645 A1 | 10/2015 | Schmidt et al. |
| 2016/0137933 A1* | 5/2016 | Ward ................... C10G 51/00 208/60 |
| 2016/0369189 A1 | 12/2016 | Ward et al. |
| 2017/0009157 A1 | 1/2017 | Oprins |

FOREIGN PATENT DOCUMENTS

| | | |
|---|---|---|
| WO | 2012071137 A1 | 5/2012 |
| WO | 2015000846 A1 | 1/2015 |
| WO | 2015000848 A1 | 1/2015 |
| WO | 2015128040 A1 | 9/2015 |
| WO | 2019036426 A1 | 2/2019 |

OTHER PUBLICATIONS

Filing Receipt and Specification of U.S. Appl. No. 62/545,643, filed Aug. 15, 2017, 42 pages.
Foreign Communication from a related application—International Search Report and Written Opinion of the International Searching Authority of Application No. PCT/US2018/046630 dated Jan. 28, 2019, 9 pages.

* cited by examiner

LIGHT OLEFIN PRODUCTION VIA AN INTEGRATED STEAM CRACKING AND HYDROCRACKING PROCESS

CROSS REFERENCE TO RELATED APPLICATIONS

This application is a filing under 35 U.S.C. 371 of International Application No. PCT/US2018/046630 filed Aug. 14, 2018, entitled "Light Olefin Production via an Integrated Steam Cracking and Hydrocracking Process" which claims priority to U.S. Provisional Application No. 62/545,643 filed Aug. 15, 2017, which applications are incorporated by reference herein in their entirety.

TECHNICAL FIELD

The present disclosure relates to methods of producing olefins, more specifically methods of producing light olefins, such as ethylene, propylene, etc.

BACKGROUND

Hydrocarbons, and specifically olefins such as ethylene and propylene, are typically building blocks used to produce a wide range of products, for example, break-resistant containers and packaging materials. Currently, for industrial scale applications, ethylene is produced by cracking natural gas condensates and petroleum distillates, which include ethane and higher hydrocarbons, and the produced ethylene is separated from a product mixture by using gas separation processes. Propylene is usually a by-product of ethylene production.

Steam cracking can be employed for the production of olefins, such as ethylene and propylene. However, steam cracking also produces higher hydrocarbons, such as $C_{4-5}$ hydrocarbons, which are conventionally hydrogenated and then recycled to the steam cracking. Steam cracking of $C_{4-5}$ hydrocarbons can be fairly inefficient for the production of $C_{2-3}$ olefins. Thus, there is an ongoing need for the development of steam cracking processes for the production of light olefins.

BRIEF SUMMARY

Disclosed herein is a process for producing olefins comprising (a) introducing a steam cracker feed stream to a liquid steam cracker furnace section to produce a steam cracker product stream, wherein the steam cracker product stream comprises olefins, and wherein an amount of olefins in the steam cracker product stream is greater than an amount of olefins in the steam cracker feed stream, (b) separating at least a portion of the steam cracker product stream in a separation unit into a hydrogen stream, a methane stream, an olefin gas stream, a saturated gas stream, a hydrocarbons gas stream, an aromatics stream, a raffinate stream, and a heavies stream; wherein the olefin gas stream comprises ethylene and propylene; wherein the saturated gas stream comprises ethane and propane; wherein the hydrocarbons gas stream comprises $C_4$ to $C_5$ hydrocarbons; wherein the aromatics stream comprises $C_6$ to $C_8$ aromatic hydrocarbons; wherein the raffinate stream comprises $C_6$ to $C_8$ non-aromatic hydrocarbons; and wherein the heavies stream comprises $C_{9+}$ hydrocarbons, (c) feeding at least a portion of the hydrocarbons gas stream and hydrogen to one or more hydroprocessing reactors to produce a hydrocracking product stream, wherein the hydrocracking product stream comprises ethane and propane, and (d) recycling at least a portion of the hydrocracking product stream and at least a portion of the saturated gas stream to the liquid steam cracker furnace section.

Further disclosed herein is a process for producing olefins comprising (a) introducing a steam cracker feed stream to a liquid steam cracker furnace section to produce a steam cracker product stream, wherein the steam cracker product stream comprises olefins, and wherein an amount of olefins in the steam cracker product stream is greater than an amount of olefins in the steam cracker feed stream, (b) separating at least a portion of the steam cracker product stream into a hydrogen stream, a methane stream, an olefin gas stream, a saturated gas stream, a hydrocarbons gas stream, an aromatics stream, a raffinate stream, and a heavies stream; wherein the olefin gas stream comprises ethylene and propylene; wherein the saturated gas stream comprises ethane and propane; wherein the hydrocarbons gas stream comprises $C_4$ to $C_5$ hydrocarbons; wherein the aromatics stream comprises $C_6$ to $C_8$ aromatic hydrocarbons; wherein the raffinate stream comprises $C_6$ to $C_8$ non-aromatic hydrocarbons; and wherein the heavies stream comprises $C_{9+}$ hydrocarbons, (c) feeding at least a portion of the hydrocarbons gas stream and at least a portion of the raffinate stream, and hydrogen to a hydrogenation reactor to produce a hydrogenation product stream, wherein the hydrogenation reactor comprises a hydroprocessing catalyst, wherein the hydrogenation product stream comprises $C_4$ to $C_8$ saturated hydrocarbons, and wherein an amount of $C_4$ to $C_8$ saturated hydrocarbons in the hydrogenation product stream is greater than an amount of $C_4$ to $C_8$ saturated hydrocarbons in the hydrocarbons gas stream and the raffinate stream, (d) feeding at least a portion of the hydrogenation product stream and hydrogen to a hydrocracking reactor to produce a hydrocracking product stream, wherein the hydrocracking reactor comprises a hydrocracking catalyst, wherein the hydrocracking catalyst comprises a metal on a support, wherein the metal comprises Pd, Pt, Ni, Co, Mn, Fe, Rh, Ir, Ru, W, Zr, or combinations thereof, and wherein the hydrocracking product stream comprises ethane and propane, and (e) recycling at least a portion of the hydrocracking product stream and at least a portion of the saturated gas stream to the liquid steam cracker furnace section.

BRIEF DESCRIPTION OF THE DRAWINGS

For a detailed description of the preferred aspects of the disclosed methods, reference will now be made to the accompanying drawing in which.

DETAILED DESCRIPTION

Figure 1:
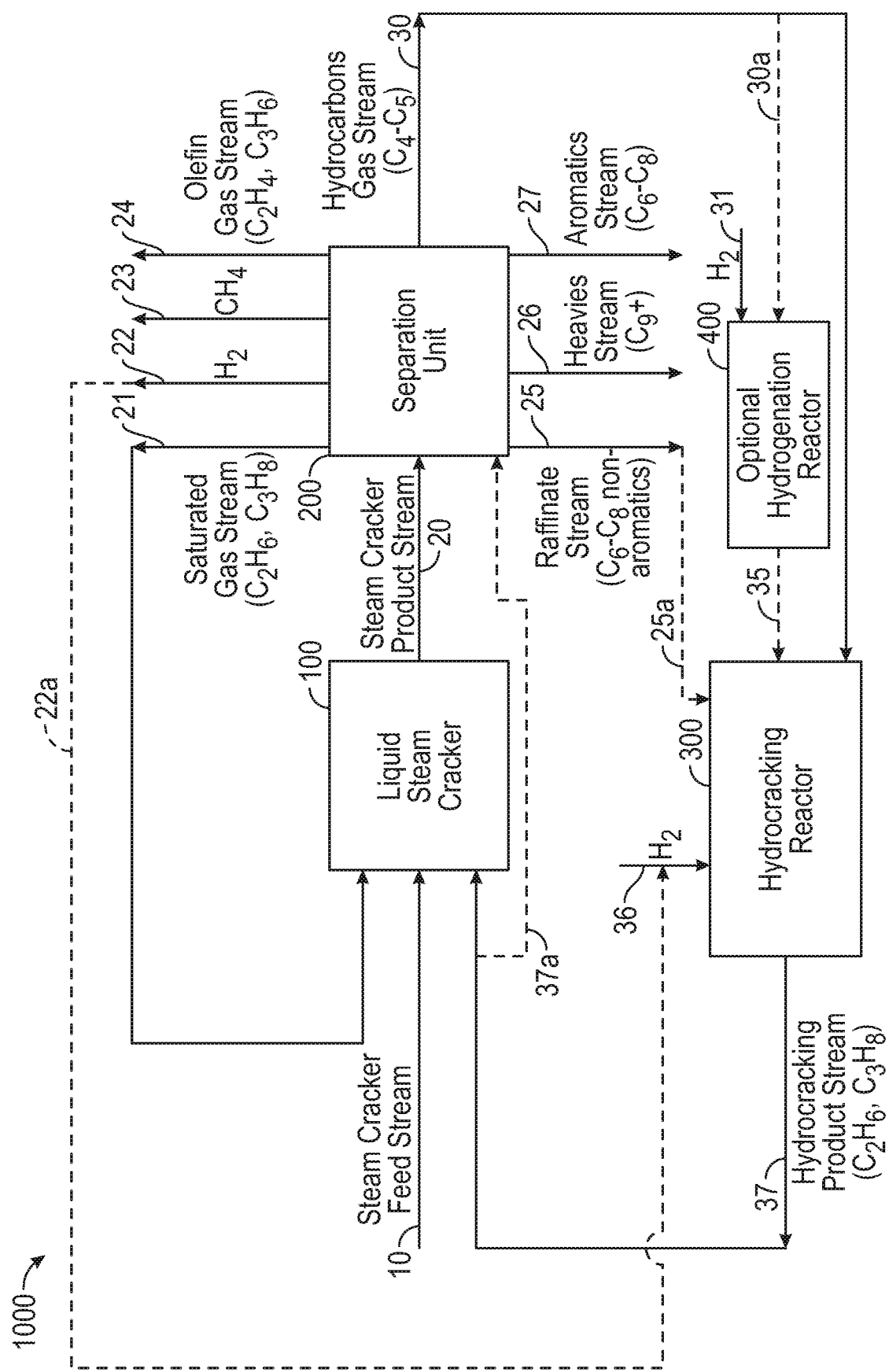
FIG. 1 displays a schematic of an olefins production system.

Disclosed herein are processes for producing olefins comprising (a) introducing a steam cracker feed stream to a liquid steam cracker furnace section to produce a steam cracker product stream, wherein the steam cracker product stream comprises olefins, and wherein an amount of olefins in the steam cracker product stream is greater than an amount of olefins in the steam cracker feed stream; (b) separating at least a portion of the steam cracker product stream into a hydrogen stream, a methane stream, an olefin gas stream, a saturated gas stream, a hydrocarbons gas stream, an aromatics stream, a raffinate stream, and a heavies stream; wherein the olefin gas stream comprises ethylene and propylene; wherein the saturated gas stream comprises ethane and propane; wherein the hydrocarbons gas stream comprises $C_4$ to $C_5$ hydrocarbons; wherein the aromatics stream comprises $C_6$ to $C_8$ aromatic hydrocarbons; wherein the raffinate stream comprises $C_6$ to $C_8$ non-aromatic hydrocarbons; and wherein the heavies stream comprises $C_{9+}$ hydrocarbons; (c) feeding at least a portion of the hydrocarbons gas stream and hydrogen to one or more hydroprocessing reactors to produce a hydrocracking product stream, wherein the hydrocracking product stream comprises ethane and propane; and (d) recycling at least a portion of the hydrocracking product stream and at least a portion of the saturated gas stream to the liquid steam cracker furnace section. In some aspects, the raffinate stream can be fed to the one or more hydroprocessing reactors.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed herein. Because these ranges are continuous, they include every value between the minimum and maximum values. The endpoints of all ranges reciting the same characteristic or component are independently combinable and inclusive of the recited endpoint. Unless expressly indicated otherwise, the various numerical ranges specified in this application are approximations. The endpoints of all ranges directed to the same component or property are inclusive of the endpoint and independently combinable. The term "from more than 0 to an amount" means that the named component is present in some amount more than 0, and up to and including the higher named amount.

The terms "a," "an," and "the" do not denote a limitation of quantity, but rather denote the presence of at least one of the referenced item. As used herein the singular forms "a," "an," and "the" include plural referents.

As used herein, "combinations thereof" is inclusive of one or more of the recited elements, optionally together with a like element not recited, e.g., inclusive of a combination of one or more of the named components, optionally with one or more other components not specifically named that have essentially the same function. As used herein, the term "combination" is inclusive of blends, mixtures, alloys, reaction products, and the like.

Reference throughout the specification to "an aspect," "another aspect," "other aspects," "some aspects," and so forth, means that a particular element (e.g., feature, structure, property, and/or characteristic) described in connection with the aspect is included in at least an aspect described herein, and may or may not be present in other aspects. In addition, it is to be understood that the described element(s) can be combined in any suitable manner in the various aspects.

As used herein, the terms "inhibiting" or "reducing" or "preventing" or "avoiding" or any variation of these terms, include any measurable decrease or complete inhibition to achieve a desired result.

As used herein, the term "effective," means adequate to accomplish a desired, expected, or intended result.

As used herein, the terms "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains") are inclusive or open-ended and do not exclude additional, unrecited elements or method steps.

Unless defined otherwise, technical and scientific terms used herein have the same meaning as is commonly understood by one of skill in the art.

Compounds are described herein using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through the carbon of the carbonyl group.

Referring to FIG. 1, an olefins production system 1000 is disclosed. The olefins production system 1000 generally comprises a liquid steam cracker furnace section 100; a separation unit 200; a hydrocracking reactor 300; and optionally a hydrogenation reactor 400.

Figure 2A:
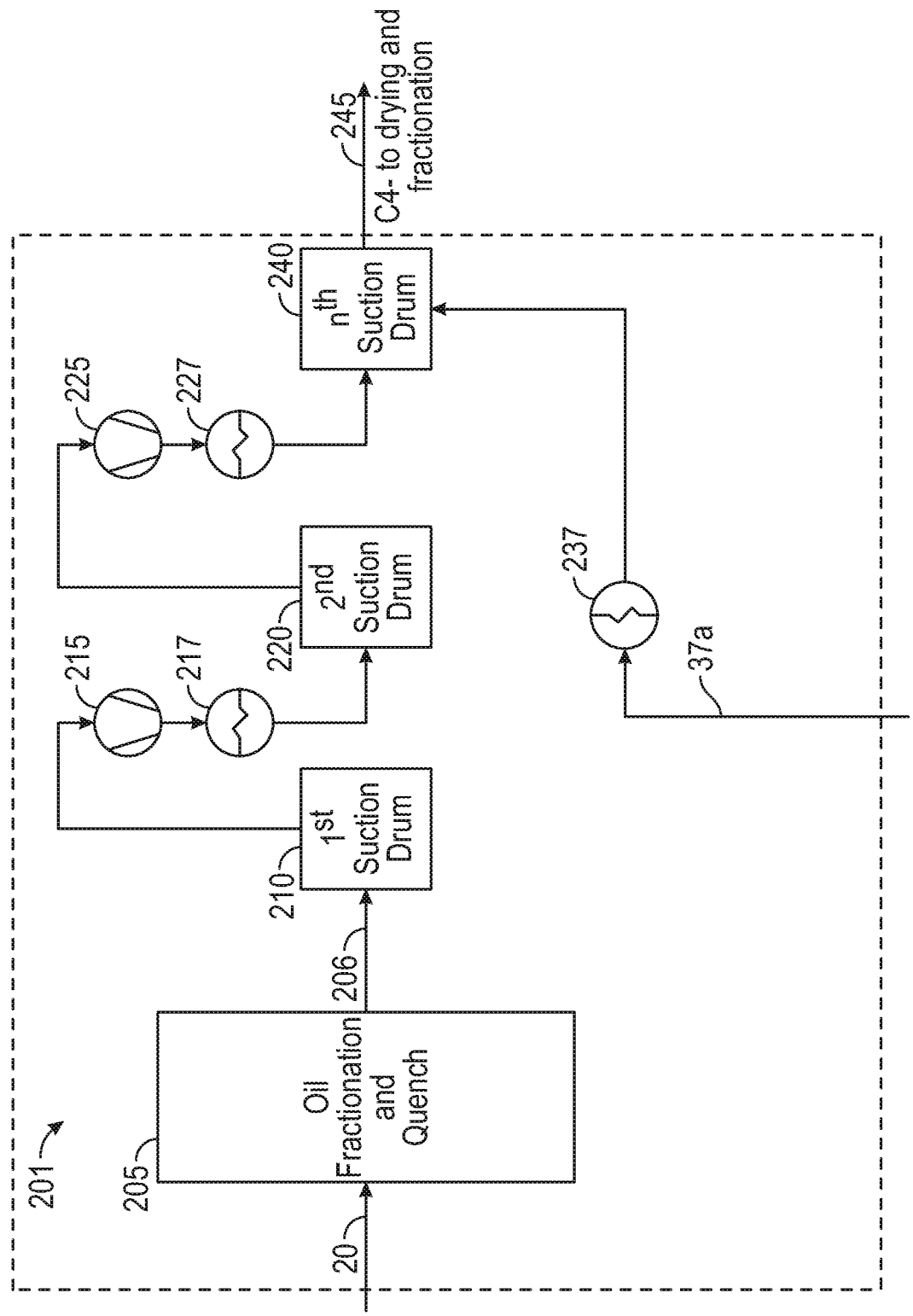
FIG. 2A displays a configuration of a separation section in an olefins production system.

Referring to FIG. 2A, a configuration of a separation unit 201 is disclosed. The separation unit 201 can comprise an oil fractionation section 205, suction drums (210, 220, 240), compressors (215, 225), and heat exchangers or coolers (217, 227, 237).

Figure 2B:
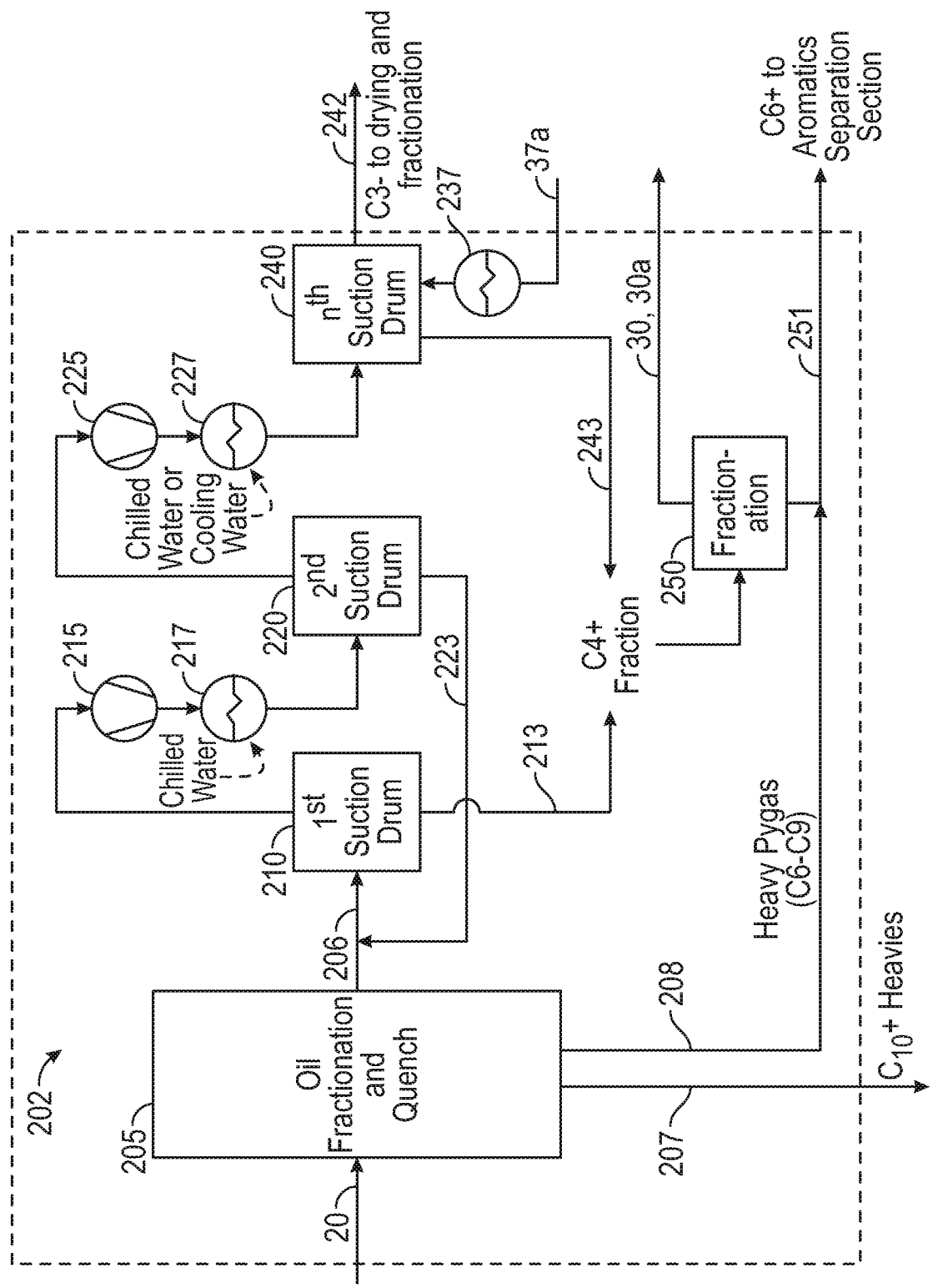
FIG. 2B displays another configuration of a separation section in an olefins production system.

Referring to FIG. 2B, a configuration of a separation unit 202 is disclosed. The separation unit 202 can comprise an oil fractionation section 205, suction drums (210, 220, 240), compressors (215, 225), heat exchangers or coolers (217, 227, 237), and a fractionation section 250. As will be appreciated by one of skill in the art, and with the help of this disclosure, olefins production system components shown in FIGS. 1, 2A and 2B can be in fluid communication with each other (as represented by the connecting lines indicating a direction of fluid flow) through any suitable conduits (e.g., pipes, streams, etc.). Common reference numerals refer to common components present in one or more of the Figures, and the description of a particular component is generally applicable across respective Figures wherein the component is present, except as otherwise indicated herein.

In an aspect, the process for producing olefins as disclosed herein can comprise introducing a steam cracker feed stream 10 to the liquid steam cracker furnace section 100 (e.g., a furnace section of the liquid steam cracker; one or more furnaces of the liquid steam cracker) to produce a steam cracker product stream 20, wherein the steam cracker product stream 20 comprises olefins, and wherein an amount of olefins in the steam cracker product stream 20 is greater than an amount of olefins in the steam cracker feed stream 10. As will be appreciated by one of skill in the art, and with the help of this disclosure, the term "steam cracker" (e.g., liquid steam cracker, gas steam cracker) can refer to a furnace section or portion of a steam cracker unit; or it can refer to both the furnace section and separation section of the steam cracker unit. The steam cracker product stream 20 can comprise olefins, such as ethylene, propylene, and $C_{4+}$ olefins; saturated hydrocarbons, such as methane, and $C_{2+}$ saturated hydrocarbons (e.g., ethane, propane, $C_4$ to $C_8$ saturated hydrocarbons, etc.); aromatics or aromatic hydrocarbons, such as $C_6$ to $C_8$ aromatic hydrocarbons; and heavies ($C_{9+}$ hydrocarbons).

Generally, steam cracking is a process in which saturated hydrocarbons are converted into unsaturated hydrocarbons (i.e., olefins), for example via cracking and/or dehydrogenation. In steam cracking, a hydrocarbon feed stream, such as the steam cracker feed stream 10, is diluted with steam and briefly heated in a furnace, in the absence of oxygen, to produce olefins. As will be appreciated by one of skill in the art, and with the help of this disclosure, some steam crackers have specific feed requirements (depending on operating constraints of individual steam crackers), such as less than about 1 wt. % olefins in the feed, based on the total weight of the feed.

Liquid steam cracker furnace sections, such as liquid steam cracker furnace section 100, generally operate at lower temperatures than gas steam crackers (e.g., gas steam cracker furnace section). As will be appreciated by one of skill in the art, and with the help of this disclosure, the composition of the steam cracker product, such as steam cracker product stream 20, depends on steam cracker parameters (e.g., temperature, residence time, hydrocarbon to steam ratio, etc.), as well as on the composition of the feed to the cracker. Heavier hydrocarbons feed streams, such as in liquid feed streams (e.g., feed streams to liquid steam cracker furnace section 100, such as steam cracker feed stream 10) can produce a substantial amount of heavier hydrocarbons (e.g., $C_{4+}$ hydrocarbons), as well as light gas olefins (e.g., ethylene, propylene, etc.). Lighter feed streams, such as gas feed streams (e.g., feed streams to a gas steam cracker) generally produce lighter olefins (e.g., ethylene, propylene) along with a substantially smaller amount of heavier hydrocarbons (e.g., butylene, butadiene, other $C_{4+}$ hydrocarbons) when compared to an amount of heavier hydrocarbons produced by a liquid steam cracker furnace section. While the current disclosure will be discussed in detail in the context of a liquid steam cracker furnace section, it should be understood that any suitable type of steam cracker can be used for carrying out the process for producing olefins as disclosed herein; for example a gas steam cracker.

In an aspect, the steam cracker feed stream 10 can comprise full-range naphtha, light naphtha, heavy naphtha, ethane, propane, butanes, shale gas condensate, distillates, virgin gas oils, hydroprocessed gas oils, crude oil, and the like, or combinations thereof. As will be appreciated by one of skill in the art, and with the help of this disclosure, the composition of the steam cracker feed stream 10 can vary, and optimal steam cracking of different components of the steam cracker feed stream 10 may occur at different temperatures. For example, ethane can be steam cracked to ethylene at a temperature that is higher than a temperature for steam cracking propane to ethylene. As such, various components of the steam cracker feed stream 10 can be introduced at different points within the liquid steam cracker furnace section, to provide for an optimum temperature for steam cracking individual components of the steam cracker feed stream 10. As will be appreciated by one of skill in the art, and with the help of this disclosure, while propylene is always produced in some amount during steam cracking, propylene will be produced in smaller amounts at higher cracking temperatures.

In an aspect, the steam cracker feed stream 10 can comprise liquid naphtha.

As will be appreciated by one of skill in the art, and with the help of this disclosure, the heavier the component, the lower the temperature required for cracking the component. For example, propane requires a cracking temperature that is lower than a cracking temperature of ethane. In aspects where components of the steam cracker feed stream 10 are not or cannot be separated into individual components and where ethylene is the main target product, the steam cracker feed stream 10 can be introduced to the liquid steam cracker furnace section at a point where the component requiring the highest temperature can be steam cracked. For example, if the steam cracker feed stream 10 comprises both ethane and propane, the steam cracker feed stream 10 can be introduced to the to the liquid steam cracker furnace section at the point where the temperature is high enough to crack ethane, as propane would also be cracked at that temperature. As will be appreciated by one of skill in the art, and with the help of this disclosure, the decision of where to introduce the feed into the furnace or furnace section can be made based on the desired product(s). For example, if ethylene is the desired product, a higher temperature can be employed than when propylene is the desired product.

In some aspects, the liquid steam cracker furnace section 100 can comprise a plurality of steam cracking furnaces (e.g., cracking zones), wherein at least some of the steam cracking furnaces can operate at temperatures different from each other, to provide for efficiently cracking individual components of the steam cracker feed stream 10. In other aspects, steam cracking furnace can comprise a plurality of cracking zones within the same steam cracking furnace, wherein at least some of the cracking zones can operate at temperatures different from each other, to provide for efficiently cracking individual components of the steam cracker feed stream 10.

In an aspect, the liquid steam cracker furnace section 100 can comprise a first cracking zone and a second cracking zone, wherein the first cracking zone is characterized by a first cracking temperature (e.g., an ethane cracking temperature; a temperature effective for steam cracking ethane), wherein the second cracking zone is characterized by a second cracking temperature (e.g., a propane cracking temperature; a temperature effective for steam cracking propane), and wherein the first cracking temperature is greater than the second cracking temperature. Multi-zone cracking furnaces are described in more detail in U.S. Publication No. 20080029434 A1, which is incorporated by reference herein in its entirety. Ethane can be fed to the first cracking zone. Propane can be fed to the second cracking zone. In aspects where ethane and propane are not or cannot be separated into individual components, both ethane and propane can be fed to the first cracking zone and/or to the second cracking zone. As will be appreciated by one of skill in the art, and with the help of this disclosure, if more ethylene is desired as a product, then both ethane and propane can be fed to the cracking zone with the higher temperature (e.g., first cracking zone); and if more propylene is desired as a product, then both ethane and propane can be fed to the cracking zone with the lower temperature (e.g., second cracking zone).

In some aspects, the same steam cracking furnace can comprise the first cracking zone and the second cracking zone. In other aspects, a first cracking furnace can comprise the first cracking zone and a second cracking furnace can comprise the second cracking zone.

In an aspect, the process for producing olefins as disclosed herein can comprise separating in the separation unit 200 at least a portion of the steam cracker product stream 20 into a hydrogen stream 22, a methane stream 23, an olefin gas stream 24, a saturated gas stream 21, a hydrocarbons gas stream 30, an aromatics stream 27, a raffinate stream 25, and a heavies stream 26; wherein the olefin gas stream 24 comprises ethylene and propylene; wherein the saturated gas stream 21 comprises ethane and propane; wherein the hydrocarbons gas stream 30 comprises $C_4$ to $C_5$ hydrocarbons (e.g., $C_4$ to $C_5$ paraffins, $C_4$ to $C_5$ olefins); wherein the aromatics stream 27 comprises $C_6$ to $C_8$ aromatic hydrocarbons; wherein the raffinate stream 25 comprises $C_6$ to $C_8$ non-aromatic (aliphatic) hydrocarbons; and wherein the heavies stream 26 comprises $C_{9+}$ hydrocarbons (e.g., $C_{9+}$ aliphatic hydrocarbons, $C_{9+}$ aromatic hydrocarbons).

The separation unit 200 can comprise any suitable separation unit that is configured to separate the steam cracker product stream 20 into the hydrogen stream 22, the methane stream 23, the olefin gas stream 24, the saturated gas stream 21, the hydrocarbons gas stream 30, the aromatics stream 27, the raffinate stream 25, and the heavies stream 26. For example, the first separation unit 200 can employ distillation, cryogenic distillation, extractive distillation, selective adsorption, selective absorption, and the like, or combinations thereof. The separation unit 200 can comprise a distillation column, a cryogenic distillation column, a trayed and/or packed separation column, a compressor, a heat exchanger, a cooling tower, a pressure swing adsorption (PSA) unit, etc.

The steam cracker product stream 20 can also comprise water (from the steam used in the liquid steam cracker furnace section), wherein the water can be condensed and separated from the steam cracker product stream 20, for example in a quench tower. The water recovered from the steam cracker product stream 20 can be further converted into steam and it can be recycled to the liquid steam cracker furnace section.

Generally, hydrogen (e.g., high-purity hydrogen) can be recovered by using a PSA process which is based on a physical binding of gas molecules to adsorbent material, wherein forces acting between gas molecules and adsorbent material depend on the gas component, type of adsorbent material, partial pressure of the gas component and operating temperature. The separation effect is based on differences in binding forces to the adsorbent material. Highly volatile components with low polarity, such as hydrogen, are practically non-adsorbable, as opposed to molecules such as hydrocarbons, nitrogen, carbon monoxide, carbon dioxide, water vapor, etc., and as such high purity hydrogen can be recovered.

Individual hydrocarbons or hydrocarbon fractions can be usually recovered by fractionation processes that can employ a variety of columns, such as a cryogenic distillation column configuration comprising a demethanizer, a deethanizer, a depropanizer, etc.

In an aspect, the process for producing olefins as disclosed herein can further comprise recovering at least a portion of ethylene from the olefin gas stream 24 to produce recovered ethylene. In some aspects, at least a portion of the recovered ethylene can be polymerized to produce a polymer product, such as polyethylene, an ethylene copolymer, ethylene oligomers, etc.

In an aspect, the process for producing olefins as disclosed herein can further comprise recovering at least a portion of propylene from the olefin gas stream 24 to produce recovered propylene. In some aspects, at least a portion of the recovered propylene can be polymerized to produce a polymer product, such as polypropylene, a propylene copolymer, propylene oligomers, etc.

The saturated gas stream 21 (e.g., ethane, propane) can be recycled to the liquid steam cracker furnace section 100. The saturated gas stream 21 is usually separated into an ethane stream and a propane stream, wherein the ethane stream can be fed to the first cracking zone of the liquid steam cracker furnace section 100, and wherein the propane stream can be fed to the second cracking zone of the liquid steam cracker furnace section 100, as previously described herein. As will be appreciated by one of skill in the art, and with the help of this disclosure, in order to produce on-spec ethylene, ethane and propane resulting from a steam cracking process are separated into an ethane stream and a propane stream (e.g., ethane comes from a $C_2$ splitter and propane comes from a $C_3$ splitter). Further, and as will be appreciated by one of skill in the art, and with the help of this disclosure, the ethane stream and the propane stream could be mixed together prior to recycling to the steam cracker, at the expense of cracking one of the components at sub-optimal conditions; which could be desired in the case of steam crackers that are constrained by the furnace capacity (e.g., number of furnaces). However, when ethane and propane are feedstocks to the steam cracking furnaces (as opposed to recycle streams in a steam cracking process), ethane and propane could be cracked together, or separated prior to cracking.

The hydrocarbons gas stream 30 can comprise $C_4$ to $C_5$ hydrocarbons (e.g., butanes, butenes, butadiene, pentanes, pentenes), both saturated and unsaturated; as well as traces (e.g., less than 5 wt. %, based on the total weight of the hydrocarbons gas stream 30) of $C_6$ hydrocarbons (e.g., benzene, hexanes, hexenes), both aromatic and aliphatic.

The raffinate stream 25 can comprise $C_6$ to $C_8$ non-aromatic hydrocarbons (e.g., $C_6$ to $C_8$ saturated hydrocarbons, $C_6$ to $C_8$ cyclic hydrocarbons, etc.)

In an aspect, the process for producing olefins as disclosed herein can further comprise separating the aromatics stream 27 into a $C_6$ aromatics stream, a $C_7$ aromatics stream, and a $C_8$ aromatics stream; wherein the $C_6$ aromatics stream comprises benzene, wherein the $C_7$ aromatics stream comprises toluene, and wherein the $C_8$ aromatics stream comprises xylenes (e.g., ortho-xylene, meta-xylene, para-xylene) and ethylbenzene. Generally, one or more distillation columns can be employed to separate components of the aromatics stream 27 based on their boiling points.

The heavies stream 26 can comprise $C_{9+}$ aliphatic hydrocarbons (e.g., saturated and unsaturated), $C_{9+}$ aromatic hydrocarbons (e.g., trimethylbenzenes, naphthalene, polyaromatic hydrocarbons), etc. The heavies stream 26 can be used as fuel or can be further processed in any other suitable unit operations.

In some aspects, separation unit 200 can comprise an oil fractionation section (e.g., oil fractionation section 205), a process steam recovery section, a compression section (e.g., compressors 215, 225), a sulfur removal section, a drying section, and a fractionation section (e.g., fractionation section 250). As will be appreciated by one of skill in the art, and with the help of this disclosure, the main purpose of the separation unit 200 is the production of on-spec final products and/or intermediate streams with adequate characteristics for further processing.

A compression section of separation unit 200 (e.g., compression section of separation unit 201; compression section of separation unit 202) can typically comprise multiple stages of compression and interstage cooling; for example 2, 3, 4, 5, 6, 7, or more stages, alternatively from 2 to 7 stages, or alternatively from 3 to 5 stages.

In an aspect, at least a portion of the steam cracker product stream 20 can be introduced to the oil fractionation section 205 to produce a cracked gas 206, a heavy pygas 208 ($C_6$-$C_9$), and a pyrolysis oil 207 ($C_{10+}$ heavies). The cracked gas 206 is produced in the oil fractionation section 205 by separation of the heavy components (e.g., heavy pygas 208, pyrolysis oil 207) and separation of most of the water which was previously fed in the form of steam in the cracking furnaces. The cracked gas 206 can comprise hydrogen, methane, $C_2$-$C_6$ hydrocarbons (e.g., paraffins, olefins), or combinations thereof.

The separation unit (200, 201, 202) can comprise a plurality of compression stages, such as a $1^{st}$ compression stage, a $2^{nd}$ compression stage, a $3^{rd}$ compression stage, a $4^{th}$ compression stage, a 5$^{th}$ compression stage, a 6$^{th}$ compression stage, a 7$^{th}$ compression stage, etc., and a n$^{th}$ compression stage (a terminal compression stage).

In an aspect, at least a portion of the cracked gas 206 can be fed to the compression section, for example to a first stage of the compression section (e.g., to a first suction drum 210) to separate components. As will be appreciated by one of skill in the art, separation of close-boiling point components (e.g., close-boiling point molecules) can be improved at high pressures, and as such compression of a stream to be separated can improve component separation. Further, as will be appreciated by one of skill in the art, interstage cooling by means of cooling media (e.g., typically cooling water) can be performed, for example to minimize polymerization of diolefinic species (e.g., butadiene) present in the cracked gas 206. Condensation of the heavy components ($C_5$-$C_6$ hydrocarbons) in the cracked gas 206 generally occurs after cooling, and separation of these heavy components before the subsequent compression stage can be carried out in suction drums (210, 220, 240).

Referring to the configuration of the separation unit 201 in FIG. 2A, at least a portion 37a of the hydrocracking product stream can be fed to the compression section of the separation unit 201, subsequent to cooling of at least a portion 37a of the hydrocracking product stream, for example in heat exchanger 237 with any suitable cooling media. Depending on the operating pressure in the hydrocracking reactor 300, at least a portion 37a of the hydrocracking product stream can be sent to a suction section of any suitable stage of compression subsequent to the second stage of compression, such as the suction section of the third stage of compression, the suction section of the fourth stage of compression, the suction section of the fifth stage of compression, the suction section of the n$^{th}$ stage of compression, etc. Interstage cooling in separation unit 201 can be achieved by using any suitable cooling media in the heat exchangers (217, 227) of the compression section, such as cooling water and/or chilled water. As will be appreciated by one of skill in the art, and with the help of this disclosure, determining which stage of compression subsequent to the second stage of compression is suitable for receiving the at least a portion 37a of the hydrocracking product stream can further account for the sulfur content of stream 37. In aspects where stream 37 originates from a hydrocracking reactor fed with substantial amounts of sulfur, stream 37 might need to be processed through a sulfur removal unit, which sulfur removal unit can be typically located between the 4th and the 5th stages of compression. The configuration of the separation unit 201 in FIG. 2A can advantageously minimize the capital investment in high-pressure separators and/or distillation columns associated with hydrocracking reactor 300.

Referring to the configuration of the separation unit 201 in FIG. 2A, stream 245 recovered from the compression section (e.g., from n$^{th}$ suction drum 240) can be further sent to drying and fractionation to produce streams 21, 22, 23, and 24.

Referring to the configuration of the separation unit 202 in FIG. 2B, interstage cooling in separation unit 202 can be achieved by using a cooling media (e.g., chilled water) with a temperature lower than conventional cooling water in at least the first stage of cooling (e.g., the first of the interstage coolers of the compression section; cooler 217). By using chilled water in the first of the interstage coolers of the compression section (e.g., cooler 217), at least a portion of the $C_4$ hydrocarbons of the cracked gas 206 can be separated. In an aspect, a stream 213 comprising $C_{4+}$ hydrocarbons can be recovered from the first suction drum 210, wherein stream 213 comprising $C_{4+}$ hydrocarbons can be further separated in the fractionation section 250 into hydrocarbons gas stream 30 and stream 251. Stream 251 can comprise $C_{6+}$ hydrocarbons and can be further sent to an aromatics separation section to recover aromatics, such as benzene, toluene, xylene, etc. A bottoms stream 223 recovered from the second suction drum 220 can be recycled to the first suction drum (for example via stream 206) to enhance the recovery of $C_4$ hydrocarbons via the first suction drum 210. Bottoms streams from suction drums in compression stages subsequent to the second compression stage (e.g., stream 243 from n$^{th}$ suction drum 240) can comprise $C_{4+}$ hydrocarbons, and can be further introduced to the fractionation section 250. The recovery of $C_4$ hydrocarbons via bottoms streams from the suction drums (210, 220, 240) can advantageously reduce compression loads in subsequent stages of compression, which in turn can advantageously allow for the recovery of stream 242 from the compression section, wherein stream 242 comprises $C_{3-}$ hydrocarbons. Further, the recovery of $C_4$ hydrocarbons via bottoms streams from the suction drums (210, 220, 240) can advantageously reduce compressor fouling problems in the compressor section owing to a lower content of $C_4$ and $C_5$ diolefins that are removed via the bottoms streams from the suction drums.

In some aspects, and referring to the configuration of the separation unit 202 in FIG. 2B, at least a portion 37a of the hydrocracking product stream can be fed to the compression section of the separation unit 202, subsequent to cooling of at least a portion 37a of the hydrocracking product stream, for example in a heat exchanger with any suitable cooling media. Depending on the operating pressure in the hydrocracking reactor 300, at least a portion 37a of the hydrocracking product stream can be sent to a suction section of any suitable stage of compression subsequent to the second stage of compression, such as the suction section of the third stage of compression, the suction section of the fourth stage of compression, the suction section of the fifth stage of compression, the suction section of the n$^{th}$ stage of compression, etc. In such aspects, the configuration of the separation unit 202 can advantageously minimize the capital investment in high-pressure separators and/or distillation columns associated with hydrocracking reactor 300. As will be appreciated by one of skill in the art, and with the help of this disclosure, a reduced load owed to separation of $C_4$s from the cracked gas 206 can be increased (e.g., supplemented) with hydrocracking product stream (e.g., at least a portion 37a of the hydrocracking product stream).

Referring to the configuration of the separation unit 202 in FIG. 2B, stream 242 recovered from the compression section (e.g., from n$^{th}$ suction drum 240) can be further sent to drying and fractionation to produce streams 21, 22, 23, and 24.

As will be appreciated by one of skill in the art, and with the help of this disclosure, the separation efficiency in various separation sections (e.g., oil fractionation section, process steam recovery section, compression section, etc.) is not 100%; and as such it is to be expected that a portion of the low and high boiling components described by means of carbon numbers will still be present in heavy and light fractions, respectively. For example, $C_{3-}$ hydrocarbons may contain a small amount of $C_4$ hydrocarbons. As another example, $C_{6+}$ hydrocarbons may contain a small amount of $C_5$ hydrocarbons.

In an aspect, the process for producing olefins as disclosed herein can comprise feeding at least a portion of the hydrocarbons gas stream 30 and optionally at least a portion 25a of the raffinate stream 25, and hydrogen 36 to one or more hydroprocessing reactors, such as the hydrocracking reactor 300, to produce a hydrocracking product stream 37, wherein the hydrocracking product stream 37 comprises ethane and propane. In some aspects, the process for producing olefins as disclosed herein can further comprise feeding a portion of the steam cracker feed stream 10 to the hydrocracking reactor 300.

The hydrogen fed to the hydrocracking reactor 300 (e.g., hydrogen 36) can comprise at least a portion 22a of the hydrogen stream 22 recovered from the separation unit 200.

The hydrocracking reactor 300 can comprise a hydrocracking catalyst. The hydrocracking catalyst can comprise a metal on a support. The combination of the metal and the support is catalytically active in a hydrocracking reaction. As would be appreciated by one of skill in the art, and with the help of this disclosure, the metal can be catalytically active for hydrogenation reactions, and the support can be catalytically active for cracking reactions. Generally, hydrocracking reactions can crack (break down) larger hydrocarbons (e.g., the hydrocarbons of the hydrocarbons gas stream 30 and/or the raffinate stream 25) into smaller hydrocarbons, as well as saturate unsaturated hydrocarbons (e.g., olefins), such that the hydrocracking product stream 37 comprises saturated small chain hydrocarbons (e.g., ethane, propane). The metal can comprise Pd, Pt, Ni, Co, Mn, Fe, Rh, Ir, Ru, W, Zr, and the like, or combinations thereof. The support can comprise a zeolite, ZSM-5, zeolite Y, mordenite, zeolite L, ZSM-22, ZSM-11, chabazite, ferrierite, zeolite beta, silated ZSM-5, zirconia, sulfated zirconia, alumina, and the like, or combinations thereof. In an aspect, the catalyst can comprise Pt on ZSM-5. In some aspects, the support can comprise a zeolite characterized by a Si:Al ratio of from about 200 to about 100.

In an aspect, the metal can be present in the hydrocracking catalyst in an amount of from about 0.01 wt. % to about 2.5 wt. %, alternatively from about 0.02 wt. % to about 1 wt. %, or alternatively from about 0.05 wt. % to about 0.5 wt. %, based on a total weight of the hydrocracking catalyst.

In an aspect, the hydrocracking reactor 300 can comprise a fixed bed reactor, a radial flow reactor, or both a fixed bed reactor and a radial flow reactor.

In an aspect, the one or more hydroprocessing reactors can comprise one hydrocracking reactor (e.g., a single hydrocracking reactor), such as the hydrocracking reactor 300.

In some aspects, the one or more hydroprocessing reactors can comprise from about 2 to about 10, alternatively from about 2 to about 6, or alternatively from about 2 to about 4 hydrocracking reactors in series. In such aspects, at least one of the hydrocracking reactors comprises a cooling unit downstream of the hydrocracking reactor, wherein the cooling unit decreases a temperature of the hydrocracking product stream 37. The one or more hydroprocessing reactors can be configured to provide interstage cooling between the hydrocracking reactors in series (wherein each reactor can represent a stage).

In other aspects, a hydrocracking reactor 300 can comprise two or more hydrocracking stages within the reactor, wherein the hydrocracking reactor further comprises interstage cooling within the reactor. As will be appreciated by one of skill in the art, and with the help of this disclosure, interstage cooling (whether between hydrocracking reactors or within a reactor) can provide for controlling a hydrocracking temperature, such that the desired products (ethane and propane) are produced.

The hydrocracking reactor 300 can be characterized by a temperature (e.g., hydrocracking temperature) of from about 350° C. to about 600° C., alternatively from about 375° C. to about 550° C., or alternatively from about 400° C. to about 500° C.

The hydrocracking reactor 300 can be characterized by a pressure (e.g., hydrocracking pressure) of from about 100 psig to about 400 psig, alternatively from about 125 psig to about 350 psig, alternatively from about 150 psig to about 300 psig, or alternatively about 200 psig.

The hydrocracking reactor 300 can be characterized by a weight hourly space velocity (WHSV) of from about 1 $h^{-1}$ to about 50 $h^{-1}$, alternatively from about 3 $h^{-1}$ to about 25 $h^{-1}$, or alternatively from about 6 $h^{-1}$ to about 10 $h^{-1}$. Generally, the WHSV refers to a mass of reagents fed per hour divided by a mass of catalyst used in a particular reactor.

The hydrocracking reactor 300 can be characterized by a hydrogen to hydrocarbon molar ratio of from about 5:1 to about 1:0.5, alternatively from about 4.5:1 to about 1:0.75, alternatively from about 4:1 to about 1:1, alternatively from about 3.5:1 to about 1:1, alternatively from about 3:1 to about 1:1, alternatively from about 2.5:1 to about 1:1, alternatively from about 2:1 to about 1:1, alternatively from about 4:1 to about 2:1, or alternatively about 3:1.

In some aspects, the olefins production system 1000 can further comprise a hydrogenation reactor 400, e.g., the one or more hydroprocessing reactors can further comprise a hydrogenation reactor 400. The hydrogenation reactor 400 and the hydrocracking reactor 300 can be in series, wherein the hydrogenation reactor 400 is upstream of the hydrocracking reactor 300. In such aspects, the process for producing olefins as disclosed herein can comprise feeding the hydrocarbons gas stream 30 (e.g., at least a portion 30a of the hydrocarbons gas stream 30), and hydrogen 31 to the hydrogenation reactor 400 to produce a hydrogenation product stream 35.

The hydrogen fed to the hydrogenation reactor 400 (e.g., hydrogen 31) can comprise at least a portion of the hydrogen stream 22 recovered from the separation unit 200.

In an aspect, the process for producing olefins as disclosed herein can comprise feeding at least a portion of the hydrogenation product stream 35 and hydrogen 36 to the hydrocracking reactor 300 to produce a hydrocracking product stream 37, wherein the hydrocracking product stream 37 comprises ethane and propane.

The hydrogenation product stream 35 can comprise $C_4$ to $C_5$ saturated hydrocarbons, wherein the $C_4$ to $C_5$ saturated hydrocarbons can be produced by saturating $C_4$ to $C_5$ hydrocarbons of the hydrocarbons gas stream 30. In some aspects, at least a portion of the raffinate stream 25 can be optionally introduced to the hydrogenation reactor 400, wherein the hydrocarbons present in the raffinate stream are substantially recovered in the hydrogenation product stream 35, and can be further introduced to the hydrocracking reactor 300. As will be appreciated by one of skill in the art, and with the help of this disclosure, at least a portion of the $C_6$ to $C_8$ saturated hydrocarbons present in the raffinate stream 25 will be recovered in the hydrogenation product stream 35. In an aspect, the hydrogenation product stream 35 can comprise $C_4$ to $C_8$ saturated hydrocarbons, wherein an amount of $C_4$ to $C_8$ saturated hydrocarbons in the hydrogenation product stream 35 is greater than an amount of $C_4$ to $C_8$ saturated hydrocarbons in the hydrocarbons gas stream 30, and optionally the raffinate stream 25.

The hydrogenation reactor 400 comprises a hydroprocessing catalyst. The hydroprocessing catalyst is catalytically active in a hydrogenation reaction. Generally, hydrogenation reactions can hydrogenate or saturate unsaturated aliphatic hydrocarbons, such as olefins, dienes, aromatics, etc., such that the hydrogenation product stream 35 comprises saturated hydrocarbons that can be further cracked in the hydrocracking reactor. In some aspects, the hydroprocessing catalyst can comprise Pt on an alumina support, Pd on an alumina support, Ni on an alumina support, Co—Mo on an alumina support, and the like, or combinations thereof.

The hydrogenation reactor 400 can be characterized by a temperature (e.g., hydrogenation temperature) of from about 60° C. to about 300° C., alternatively from about 75° C. to about 275° C., or alternatively from about 100° C. to about 250° C.

The hydrogenation reactor 400 can be characterized by a pressure (e.g., hydrogenation pressure) of from about 350 psig to about 600 psig, alternatively from about 375 psig to about 575 psig, or alternatively from about 350 psig to about 550 psig.

The hydrogenation reactor 400 can be characterized by a liquid hourly space velocity (LHSV) of from about 1 $h^{-1}$ to about 10 $h^{-1}$, alternatively from about 1.5 $h^{-1}$ to about 7.5 $h^{-1}$, alternatively from about 2 $h^{-1}$ to about 5 $h^{-1}$, or alternatively about 3 $h^{-1}$. Generally, the LHSV refers to a volume of reagents fed per hour divided by the reactor volume.

The hydrocracking product stream 37 (e.g., ethane, propane) can be recycled to the liquid steam cracker furnace section 100. The hydrocracking product stream 37 can be separated into an ethane stream and a propane stream. The ethane stream can be fed to the first cracking zone of the liquid steam cracker furnace section 100. The propane stream can be fed to the second cracking zone of the liquid steam cracker furnace section 100, as previously described herein. In aspects where the ethane and the propane of the hydrocracking product stream 37 are not or cannot be separated into individual components, both ethane and propane can be fed to the first cracking zone and/or the second cracking zone of the liquid steam cracker furnace section 100, as previously described herein.

In an aspect, the hydrocracking product stream 37 can further comprise methane, wherein at least a portion of the methane can be recovered from the hydrocracking product stream 37 (e.g., via a demethanizer) prior to recycling at least a portion of the hydrocracking product stream 37 to the liquid steam cracker furnace section 100. A demethanizer used for recovering at least a portion of the methane from the hydrocracking product stream 37 could be the same demethanizer in the separation unit 200 that is used for recovering the methane stream 23 from steam cracker product stream 20. For example, at least a portion 37a of the hydrocracking product stream 37 could be introduced to a demethanizer in the separation unit 200. As will be appreciated by one of skill in the art, and with the help of this disclosure, methane that would be recycled to the liquid steam cracker furnace section 100 would act as a diluent in the liquid steam cracker furnace section (as methane does not get steam cracked), and it is not cost effective to dilute the steam cracker feed stream 10 with methane. In some aspects, the recovered methane could be used as fuel, for example to supply a portion of the energy required by the steam cracker, separation unit, etc.

In an aspect, the hydrocracking product stream 37 can further comprise hydrogen, wherein at least a portion of the hydrogen can be recovered from the hydrocracking product stream 37 prior to recycling at least a portion of the hydrocracking product stream 37 to the liquid steam cracker furnace section 100. A PSA unit used for recovering at least a portion of the hydrogen from the hydrocracking product stream 37 could be the same PSA unit in the separation unit 200 that is used for recovering the hydrogen stream 22 from steam cracker product stream 20. The hydrogen recovered from the hydrocracking product stream 37 can be recycled to the hydrocracking reactor 300 and/or the hydrogenation reactor 400.

In an aspect, the hydrocracking product stream 37 can further comprise $C_4$ to $C_5$ hydrocarbons; wherein an amount of $C_4$ to $C_5$ hydrocarbons in the hydrocracking product stream 37 is less than an amount of $C_4$ to $C_5$ hydrocarbons in the hydrocarbons gas stream 30, and optionally the raffinate stream 25 and/or the hydrogenation product stream 35. In such aspect, at least a portion of the $C_4$ to $C_5$ hydrocarbons can be recovered from the hydrocracking product stream 37 prior to recycling at least a portion of the hydrocracking product stream 37 to the liquid steam cracker furnace section 100. The $C_4$ to $C_5$ hydrocarbons recovered from the hydrocracking product stream 37 can be recycled to the hydrocracking reactor 300 and/or the hydrogenation reactor 400.

In an aspect, the process for producing olefins as disclosed herein can be characterized by an ethylene to propylene weight ratio that is equal to or greater than about 3:1, alternatively equal to or greater than about 4:1, or alternatively equal to or greater than about 5:1.

In an aspect, the process for producing olefins as disclosed herein can be characterized by an ethylene to propylene weight ratio that is increased by equal to or greater than about 10%, alternatively equal to or greater than about 25%, alternatively equal to or greater than about 50%, alternatively equal to or greater than about 75%, or alternatively equal to or greater than about 100%, when compared to an ethylene to propylene weight ratio in an otherwise similar process that lacks the steps of (i) feeding at least a portion of the hydrocarbons gas stream and hydrogen to one or more hydroprocessing reactors to produce a hydrocracking product stream; and (ii) recycling at least a portion of the hydrocracking product stream and at least a portion of the saturated gas stream to the liquid steam cracker furnace section. As will be appreciated by one of skill in the art, and with the help of this disclosure, an ethylene to propylene weight ratio in an otherwise similar process that lacks the steps of (i) feeding at least a portion of the hydrocarbons gas stream and hydrogen to one or more hydroprocessing reactors to produce a hydrocracking product stream; and (ii) recycling at least a portion of the hydrocracking product stream and at least a portion of the saturated gas stream to the liquid steam cracker furnace section; is less than about 3:1.

In an aspect, a process for producing olefins can comprise (a) introducing a steam cracker feed stream 10 and steam to the liquid steam cracker furnace section 100 to produce a steam cracker product stream 20, wherein the steam cracker product stream 20 comprises olefins (e.g., $C_{2+}$ olefins, such as ethylene and propylene), and wherein an amount of olefins in the steam cracker product stream 20 is greater than an amount of olefins in the steam cracker feed stream 10; (b) separating at least a portion of the steam cracker product stream 20 in the separation unit 200 into a hydrogen stream 22, a methane stream 23, an olefin gas stream 24, a saturated gas stream 21, a hydrocarbons gas stream 30, an aromatics stream 27, a raffinate stream 25, and a heavies stream 26; wherein the olefin gas stream 24 comprises ethylene and propylene; wherein the saturated gas stream 21 comprises ethane and propane; wherein the hydrocarbons gas stream 30 comprises $C_4$ to $C_5$ hydrocarbons; wherein the aromatics stream 27 comprises $C_6$ to $C_8$ aromatic hydrocarbons; wherein the raffinate stream 25 comprises $C_6$ to $C_8$ non-aromatic hydrocarbons; and wherein the heavies stream 26 comprises $C_{9+}$ hydrocarbons; (c) feeding at least a portion 30a of the hydrocarbons gas stream 30 and optionally at least a portion of the raffinate stream 25, and hydrogen 31 to a hydrogenation reactor 400 to produce a hydrogenation product stream 35, wherein the hydrogenation reactor 400 comprises a hydroprocessing catalyst, wherein the hydrogenation product stream 35 comprises $C_4$ to $C_8$ saturated hydrocarbons, and wherein an amount of $C_4$ to $C_8$ saturated hydrocarbons in the hydrogenation product stream 35 is greater than an amount of $C_4$ to $C_8$ saturated hydrocarbons in the hydrocarbons gas stream 30 and the raffinate stream 25; (d) feeding at least a portion of the hydrogenation product stream 35 and hydrogen 36 to a hydrocracking reactor 300 to produce a hydrocracking product stream 37, wherein the hydrocracking reactor 300 comprises a hydrocracking catalyst, wherein the hydrocracking catalyst comprises a metal on a support, wherein the metal comprises Pd, Pt, Ni, Co, Mn, Fe, Rh, Ir, Ru, W, Zr, or combinations thereof, and wherein the hydrocracking product stream 37 comprises ethane and propane; and (e) recycling at least a portion of the hydrocracking product stream 37 and at least a portion of the saturated gas stream 21 to the liquid steam cracker furnace section 100. The support can comprise a zeolite, such as ZSM-5.

In an aspect, a process for producing olefins can comprise (a) introducing a steam cracker feed stream and steam to a gas steam cracker to produce a steam cracker product stream, wherein the steam cracker product stream comprises olefins (e.g., $C_{2+}$ olefins, such as ethylene and propylene), and wherein an amount of olefins in the steam cracker product stream is greater than an amount of olefins in the steam cracker feed stream; (b) separating at least a portion of the steam cracker product stream in a separation unit into a hydrogen stream, a methane stream, an olefin gas stream, a saturated gas stream, a hydrocarbons gas stream, an aromatics stream, a raffinate stream, and a heavies stream; wherein the olefin gas stream comprises ethylene and propylene; wherein the saturated gas stream comprises ethane and propane; wherein the hydrocarbons gas stream comprises $C_4$ to $C_5$ hydrocarbons; wherein the aromatics stream comprises $C_6$ to $C_8$ aromatic hydrocarbons; wherein the raffinate stream comprises $C_6$ to $C_8$ non-aromatic hydrocarbons; and wherein the heavies stream comprises $C_{9+}$ hydrocarbons; (c) optionally feeding at least a portion of the hydrocarbons gas stream and optionally at least a portion of the raffinate stream, and hydrogen to a hydrogenation reactor to produce a hydrogenation product stream, wherein the hydrogenation reactor comprises a hydroprocessing catalyst, wherein the hydrogenation product stream comprises $C_4$ to $C_8$ saturated hydrocarbons, and wherein an amount of $C_4$ to $C_8$ saturated hydrocarbons in the hydrogenation product stream is greater than an amount of $C_4$ to $C_8$ saturated hydrocarbons in the hydrocarbons gas stream and the raffinate stream; (d) feeding at least a portion of the hydrogenation product stream and/or at least a portion of the hydrocarbons gas stream, and hydrogen to a hydrocracking reactor to produce a hydrocracking product stream, wherein the hydrocracking reactor comprises a hydrocracking catalyst, wherein the hydrocracking catalyst comprises a metal on a support, wherein the metal comprises Pd, Pt, Ni, Co, Mn, Fe, Rh, Ir, Ru, W, Zr, or combinations thereof, and wherein the hydrocracking product stream comprises ethane and propane; and (e) recycling at least a portion of the hydrocracking product stream and at least a portion of the saturated gas stream to the gas steam cracker. The support can comprise a zeolite, such as ZSM-5.

In an aspect, a process for producing olefins as disclosed herein can advantageously display improvements in one or more method characteristics when compared to an otherwise similar process that lacks the steps of (i) feeding at least a portion of the hydrocarbons gas stream and hydrogen to one or more hydroprocessing reactors to produce a hydrocracking product stream; and (ii) recycling at least a portion of the hydrocracking product stream and at least a portion of the saturated gas stream to the liquid steam cracker furnace section. The process for producing olefins as disclosed herein can advantageously provide for a recycled feed to the liquid steam cracker furnace section that comprises ethane and propane, thereby providing for an increased steam cracking yield to ethylene and propylene. Without wishing to be limited by theory, it is more efficient to steam crack ethane and propane to ethylene and propylene than to steam crack $C_4$ to $C_5$ hydrocarbons to ethylene and propylene (e.g., steam cracking ethane and propane to ethylene and propylene creates less byproducts than steam cracking $C_4$ to $C_5$ hydrocarbons to ethylene and propylene).

In an aspect, a process for producing olefins as disclosed herein can advantageously provide for increasing an ethylene to propylene weight ratio by hydrocracking at least a portion of the hydrocarbons gas stream recovered from a product stream from a liquid steam cracker furnace section. As will be appreciated by one of skill in the art, and with the help of this disclosure, a product recovered from a gas steam cracker might not contain an amount of heavier hydrocarbons ($C_{4+}$) that is substantial enough to necessitate further hydrocracking.

In an aspect, a process for producing olefins as disclosed herein can advantageously provide for expanding feedstock flexibility of existing ethane/propane steam crackers to heavier feedstocks.

As would be appreciated by one of skill in the art, and with the help of this disclosure, hydrocracking $C_{4-5}$ hydrocarbons prior to steam cracking (as opposed to steam cracking $C_{4-5}$ hydrocarbons) significantly and advantageously reduces the complexity of separations downstream of the steam cracker for $C_{4+}$ hydrocarbons (e.g., butadiene, isobutylene, 1-butene, 1-pentene, benzene, etc.). Further, as would be appreciated by one of skill in the art, and with the help of this disclosure, shorter chain hydrocarbons, such as $C_2$-$C_3$ saturated hydrocarbons (alkanes), can be converted in a steam cracker to ethylene and propylene more efficiently than longer chain hydrocarbons (e.g., $C_4$-$C_5$ hydrocarbons). Without wishing to be limited by theory, $C_4$-$C_5$ hydrocarbons can undergo an increased number of fragmentation reactions when compared to $C_2$-$C_3$ hydrocarbons; and these fragmentation reactions can result in the formation of more hydrocarbon fragments (e.g., free radical fragments) in the case of $C_4$-$C_5$ hydrocarbons, as compared to $C_2$-$C_3$ hydrocarbons. For example, a $C_5$ hydrocarbon could generate a $C_5$ hydrocarbon fragment, a $C_4$ hydrocarbon fragment, a $C_3$ hydrocarbon fragment, a $C_2$ hydrocarbon fragment, a $C_1$ hydrocarbon fragment, or combinations thereof, while a $C_2$ hydrocarbon could generate a $C_2$ hydrocarbon fragment and/or a $C_1$ hydrocarbon fragment.

In an aspect, the size of the separation of $C_{4+}$ hydrocarbons downstream of the steam cracker can be advantageously reduced, owing to having less $C_{4+}$ hydrocarbons in the steam cracker product stream. Additional advantages of the process for producing olefins as disclosed herein can be apparent to one of skill in the art viewing this disclosure.

EXAMPLES

The subject matter having been generally described, the following examples are given as particular embodiments of the disclosure and to demonstrate the practice and advantages thereof. It is understood that the examples are given by way of illustration and are not intended to limit the specification of the claims to follow in any manner.

Example 1

The distribution of products was investigated for an olefin production system similar to the olefins production system 1000 of FIG. 1. The distribution of hydrocracking products was calculated from experimental data collected using the following conditions: a Pt/ZSM-5 catalyst at 450° C., a weight hourly space velocity (WHSV) of 4 $h^{-1}$, a hydrogen to hydrocarbon molar ratio of 3:1, and a pressure of 200 psig. The steam cracking kinetics were taken into account rigorously: a SPYRO software for steam cracker product slate calculations was used. The following liquid steam cracker furnace conditions were applied for all feeds: COT (Coil Outlet Temperature)=845° C. and a steam-to-oil ratio=0.37, and the data are displayed in Table 1 for a n-pentane feed, as well as a n-butane feed.

TABLE 1

|  | Ethylene Yield [%] | Propylene Yield [%] | Total Yield [%] | E/P* |
| --- | --- | --- | --- | --- |
| n-butane direct steam cracking | 46 | 20 | 66 | 2.3 |
| n-butane hydrocracking followed by steam cracking | 52 | 13 | 65 | 4.0 |
| n-pentane direct steam cracking | 34 | 21 | 56 | 1.6 |
| n-pentane hydrocracking followed by steam cracking | 54 | 10 | 64 | 5.4 |

E/P = ethylene to propylene weight ratio.

For a steam cracker feed stream (such as steam cracker feed stream 10 in FIG. 1) containing n-pentane, the product yields that could be achieved by steam cracking n-pentane would be approximately 34% ethylene and 21% propylene, for a total yield of about 56%. Yields are given in wt. %.

If n-pentane were subjected to hydrocracking in a hydrocracking reactor such as hydrocracking reactor 300 in FIG. 1, a n-pentane hydrocracking product distribution of 7.6 wt. % methane, 37.8 wt. % ethane, and 54.6 wt. % propane would be obtained. If a n-pentane hydrocracking product with this product distribution would be sent to a liquid steam cracker furnace section, such as liquid steam cracker furnace section 100 in FIG. 1, then the yields obtained from steam cracking would be 54% ethylene and 10% propylene, for a total yield of about 64%. By hydrocracking n-pentane prior to steam cracking, the total yield could be increased by 8%, and the yield of ethylene could be specifically increased by 20%. Further, by hydrocracking n-pentane prior to steam cracking, the ethylene yield would also be increased, thereby providing for an increased amount of ethylene, which is of higher value than propylene.

For a steam cracker feed stream (such as steam cracker feed stream 10 in FIG. 1) containing n-butane, the product yields that could be achieved by steam cracking n-butane would be approximately 46% ethylene and 20% propylene, for a total yield of about 66%.

If n-butane were subjected to hydrocracking in a hydrocracking reactor such as hydrocracking reactor 300 in FIG. 1, one could assume a n-butane hydrocracking product distribution of 3.8 wt. % methane, 22.4 wt. % ethane, and 73.8 wt. % propane would be obtained. If a n-butane hydrocracking product with this product distribution would be sent to a liquid steam cracker furnace section, such as liquid steam cracker furnace section 100 in FIG. 1, then the yields obtained from steam cracking would be 52% ethylene and 13% propylene, for a total yield of about 65%. By hydrocracking n-butane prior to steam cracking, the yield of ethylene could be increased by 6%. Further, by hydrocracking n-butane prior to steam cracking, the ethylene yield would also be increased, thereby providing for an increased amount of ethylene, which is of higher value than propylene.

For the purpose of any U.S. national stage filing from this application, all publications and patents mentioned in this disclosure are incorporated herein by reference in their entireties, for the purpose of describing and disclosing the constructs and methodologies described in those publications, which might be used in connection with the methods of this disclosure. Any publications and patents discussed herein are provided solely for their disclosure prior to the filing date of the present application. Nothing herein is to be construed as an admission that the inventors are not entitled to antedate such disclosure by virtue of prior invention.

In any application before the United States Patent and Trademark Office, the Abstract of this application is provided for the purpose of satisfying the requirements of 37 C.F.R. § 1.72 and the purpose stated in 37 C.F.R. § 1.72(b) "to enable the United States Patent and Trademark Office and the public generally to determine quickly from a cursory inspection the nature and gist of the technical disclosure." Therefore, the Abstract of this application is not intended to be used to construe the scope of the claims or to limit the scope of the subject matter that is disclosed herein. Moreover, any headings that can be employed herein are also not intended to be used to construe the scope of the claims or to limit the scope of the subject matter that is disclosed herein. Any use of the past tense to describe an example otherwise indicated as constructive or prophetic is not intended to reflect that the constructive or prophetic example has actually been carried out.

The present disclosure is further illustrated by the following examples, which are not to be construed in any way as imposing limitations upon the scope thereof. On the contrary, it is to be clearly understood that resort can be had to various other aspects, embodiments, modifications, and equivalents thereof which, after reading the description herein, can be suggest to one of ordinary skill in the art without departing from the spirit of the present invention or the scope of the appended claims.

Additional Disclosure

A first aspect, which is a process for producing olefins comprising (a) introducing a steam cracker feed stream to a liquid steam cracker furnace section to produce a steam cracker product stream, wherein the steam cracker product stream comprises olefins, and wherein an amount of olefins in the steam cracker product stream is greater than an amount of olefins in the steam cracker feed stream; (b) separating at least a portion of the steam cracker product stream in a separation unit into a hydrogen stream, a methane stream, an olefin gas stream, a saturated gas stream, a hydrocarbons gas stream, an aromatics stream, a raffinate stream, and a heavies stream; wherein the olefin gas stream comprises ethylene and propylene; wherein the saturated gas stream comprises ethane and propane; wherein the hydrocarbons gas stream comprises $C_4$ to $C_5$ hydrocarbons; wherein the aromatics stream comprises $C_6$ to $C_8$ aromatic hydrocarbons; wherein the raffinate stream comprises $C_6$ to $C_8$ non-aromatic hydrocarbons; and wherein the heavies stream comprises $C_{9+}$ hydrocarbons; (c) feeding at least a portion of the hydrocarbons gas stream and hydrogen to one or more hydroprocessing reactors to produce a hydrocracking product stream, wherein the hydrocracking product stream comprises ethane and propane; and (d) recycling at least a portion of the hydrocracking product stream and at least a portion of the saturated gas stream to the liquid steam cracker furnace section.

A second aspect, which is the process of the first aspect, wherein the one or more hydroprocessing reactors comprise a hydrocracking reactor, and wherein the hydrocracking reactor comprises a hydrocracking catalyst.

A third aspect, which is the process of the second aspect, wherein the hydrocracking reactor is characterized by a temperature of from about 350° C. to about 600° C.

A fourth aspect, which is the process of any one of the first through the third aspects, wherein the hydrocracking reactor is characterized by a pressure of from about 100 psig to about 400 psig.

A fifth aspect, which is the process of any one of the first through the fourth aspects, wherein the hydrocracking reactor is characterized by a weight hourly space velocity (WHSV) of from about 1 $h^{-1}$ to about 50 $h^{-1}$.

A sixth aspect, which is the process of any one of the first through the fifth aspects, wherein the hydrocracking reactor is characterized by a hydrogen to hydrocarbon molar ratio of from about 5:1 to about 1:0.5.

A seventh aspect, which is the process of any one of the first through the sixth aspects, wherein the hydrocracking catalyst comprises a metal on a support, wherein the metal comprises Pd, Pt, Ni, Co, Mn, Fe, Rh, Ir, Ru, W, Zr, or combinations thereof.

An eighth aspect, which is the process of the seventh aspect, wherein the support comprises a zeolite, ZSM-5, zeolite Y, mordenite, zeolite L, ZSM-22, ZSM-11, chabazite, ferrierite, zeolite beta, silated ZSM-5, zirconia, sulfated zirconia, alumina, or combinations thereof.

A ninth aspect, which is the process of any one of the first through the eighth aspects, wherein the metal is present in the hydrocracking catalyst in an amount of from about 0.01 wt. % to about 2.5 wt. %, based on a total weight of the hydrocracking catalyst.

A tenth aspect, which is the process of any one of the first through the ninth aspects, wherein the hydrocracking reactor comprises a fixed bed reactor, a radial flow reactor, or both.

An eleventh aspect, which is the process of any one of the first through the tenth aspects, wherein the one or more hydroprocessing reactors further comprise a hydrogenation reactor, wherein the hydrogenation reactor comprises a hydroprocessing catalyst.

A twelfth aspect, which is the process of the eleventh aspect, wherein the hydrogenation reactor and the hydrocracking reactor are in series, and wherein the hydrogenation reactor is upstream of the hydrocracking reactor.

A thirteenth aspect, which is the process of any one of the first through the twelfth aspects, wherein the hydrogenation reactor is characterized by a temperature of from about 60° C. to about 300° C.

A fourteenth aspect, which is the process of any one of the first through the thirteenth aspects, wherein the hydrogenation reactor is characterized by a pressure of from about 350 psig to about 600 psig.

A fifteenth aspect, which is the process of any one of the first through the fourteenth aspects, wherein the hydrogenation reactor is characterized by a liquid hourly space velocity (LHSV) of from about 1 $h^{-1}$ to about 10 $h^{-1}$.

A sixteenth aspect, which is the process of any one of the first through the fifteenth aspects, wherein the hydroprocessing catalyst comprises Pt on an alumina support, Pd on an alumina support, Ni on an alumina support, Co—Mo on an alumina support, or combinations thereof.

A seventeenth aspect, which is the process of any one of the first through the sixteenth aspects, wherein the one or more hydroprocessing reactors comprise from about 2 to about 10 hydrocracking reactors in series.

An eighteenth aspect, which is the process of the seventeenth aspect, wherein at least one of the hydrocracking reactors in series comprises a cooling unit downstream of the hydrocracking reactor, and wherein the cooling unit decreases a temperature of the hydrocracking product stream.

A nineteenth aspect, which is the process of any one of the first through the eighteenth aspects, wherein the liquid steam cracker furnace section comprises a first cracking zone and a second cracking zone, wherein the first cracking zone is characterized by an ethane cracking temperature, wherein the second cracking zone is characterized by a propane cracking temperature, and wherein the ethane cracking temperature is greater than the propane cracking temperature.

A twentieth aspect, which is the process of the nineteenth aspect further comprising feeding at least a portion of the hydrocracking product stream and/or at least a portion of the saturated gas stream to the first cracking zone.

A twenty-first aspect, which is the process of any one of the first through the twentieth aspects further comprising separating at least a portion of the hydrocracking product stream and/or at least a portion of the saturated gas stream into an ethane stream and a propane stream.

A twenty-second aspect, which is the process of the twenty-first aspect further comprising (i) feeding at least a portion of the ethane stream to the first cracking zone, and (ii) feeding at least a portion of the propane stream to the second cracking zone.

A twenty-third aspect, which is the process of any one of the first through the twenty-second aspects, wherein the hydrocracking product stream further comprises methane, and wherein step (d) further comprises separating at least a portion of the methane from the hydrocracking product stream prior to recycling at least a portion of the hydrocracking product stream to the liquid steam cracker furnace section.

A twenty-fourth aspect, which is the process of any one of the first through the twenty-third aspects, wherein the hydrocracking product stream further comprises hydrogen, and wherein step (d) further comprises separating at least a portion of the hydrogen from the hydrocracking product stream prior to recycling at least a portion of the hydrocracking product stream to the liquid steam cracker furnace section.

A twenty-fifth aspect, which is the process of any one of the first through the twenty-fourth aspects, wherein the hydrocracking product stream further comprises $C_4$ to $C_5$ hydrocarbons; wherein an amount of $C_4$ to $C_5$ hydrocarbons in the hydrocracking product stream is less than an amount of $C_4$ to $C_5$ hydrocarbons in the hydrocarbons gas stream;

and wherein step (d) further comprises separating at least a portion of the $C_4$ to $C_5$ hydrocarbons from the hydrocracking product stream prior to recycling at least a portion of the hydrocracking product stream to the liquid steam cracker furnace section.

A twenty-sixth aspect, which is the process of the twenty-fifth aspect further comprising recycling at least a portion of the separated $C_4$ to $C_5$ hydrocarbons to the one or more hydroprocessing reactors.

A twenty-seventh aspect, which is the process of any one of the first through the twenty-sixth aspects further comprising introducing at least a portion of the hydrogen stream to the one or more hydroprocessing reactors.

A twenty-eighth aspect, which is the process of any one of the first through the twenty-seventh aspects further comprising introducing at least a portion of the raffinate stream to the one or more hydroprocessing reactors.

A twenty-ninth aspect, which is the process of any one of the first through the twenty-eighth aspects, wherein the steam cracker feed stream comprises full-range naphtha, light naphtha, heavy naphtha, ethane, propane, butanes, shale gas condensate, distillates, virgin gas oils, hydroprocessed gas oils, crude oil, or combinations thereof.

A thirtieth aspect, which is the process of any one of the first through the twenty-ninth aspects, wherein an ethylene to propylene weight ratio is increased by equal to or greater than about 10% when compared to an ethylene to propylene weight ratio in an otherwise similar process that lacks the steps of (i) feeding at least a portion of the hydrocarbons gas stream and hydrogen to one or more hydroprocessing reactors to produce a hydrocracking product stream; and (ii) recycling at least a portion of the hydrocracking product stream and at least a portion of the saturated gas stream to the liquid steam cracker furnace section.

A thirty-first aspect, which is the process of any one of the first through the thirtieth aspects, wherein an ethylene to propylene weight ratio is equal to or greater than about 3:1.

A thirty-second aspect, which is the process of any one of the first through the thirty-first aspects further comprising separating at least a portion of the aromatics stream into a $C_6$ aromatics stream, a $C_7$ aromatics stream, and a $C_8$ aromatics stream, wherein the $C_6$ aromatics stream comprises benzene, wherein the $C_7$ aromatics stream comprises toluene, and wherein the $C_8$ aromatics stream comprises xylenes and ethylbenzene.

A thirty-third aspect, which is the process of any one of the first through the thirty-second aspects, wherein the separation unit comprises a plurality of compression stages, and wherein a portion of the hydrocracking product stream is introduced to a terminal compression stage.

A thirty-fourth aspect, which is the process of any one of the first through the thirty-third aspects, wherein the separation unit comprises a plurality of compression stages, wherein at least a portion of $C_4$ hydrocarbons is separated from the steam cracker product stream by using a cooling media with a temperature lower than conventional cooling water in at least one compression stage subsequent to the first compression stage.

A thirty-fifth aspect, which is a process for producing olefins comprising (a) introducing a steam cracker feed stream to a liquid steam cracker furnace section to produce a steam cracker product stream, wherein the steam cracker product stream comprises olefins, and wherein an amount of olefins in the steam cracker product stream is greater than an amount of olefins in the steam cracker feed stream; (b) separating at least a portion of the steam cracker product stream into a hydrogen stream, a methane stream, an olefin gas stream, a saturated gas stream, a hydrocarbons gas stream, an aromatics stream, a raffinate stream, and a heavies stream; wherein the olefin gas stream comprises ethylene and propylene; wherein the saturated gas stream comprises ethane and propane; wherein the hydrocarbons gas stream comprises $C_4$ to $C_5$ hydrocarbons; wherein the aromatics stream comprises $C_6$ to $C_8$ aromatic hydrocarbons; wherein the raffinate stream comprises $C_6$ to $C_8$ non-aromatic hydrocarbons; and wherein the heavies stream comprises $C_{9+}$ hydrocarbons; (c) feeding at least a portion of the hydrocarbons gas stream and at least a portion of the raffinate stream, and hydrogen to a hydrogenation reactor to produce a hydrogenation product stream, wherein the hydrogenation reactor comprises a hydroprocessing catalyst, wherein the hydrogenation product stream comprises $C_4$ to $C_8$ saturated hydrocarbons, and wherein an amount of $C_4$ to $C_8$ saturated hydrocarbons in the hydrogenation product stream is greater than an amount of $C_4$ to $C_8$ saturated hydrocarbons in the hydrocarbons gas stream and the raffinate stream; (d) feeding at least a portion of the hydrogenation product stream and hydrogen to a hydrocracking reactor to produce a hydrocracking product stream, wherein the hydrocracking reactor comprises a hydrocracking catalyst, wherein the hydrocracking catalyst comprises a metal on a support, wherein the metal comprises Pd, Pt, Ni, Co, Mn, Fe, Rh, Ir, Ru, W, Zr, or combinations thereof, and wherein the hydrocracking product stream comprises ethane and propane; and (e) recycling at least a portion of the hydrocracking product stream and at least a portion of the saturated gas stream to the liquid steam cracker furnace section.

A thirty-sixth aspect, which is the process of the thirty-fifth aspect, wherein the support comprises a zeolite, ZSM-5, zeolite Y, mordenite, zeolite L, ZSM-22, ZSM-11, chabazite, ferrierite, zeolite beta, silated ZSM-5, zirconia, sulfated zirconia, alumina, or combinations thereof.

A thirty-seventh aspect, which is the process of any one of the thirty-fifth and the thirty-sixth aspects, wherein an ethylene to propylene weight ratio is equal to or greater than about 3:1.

A thirty-eighth aspect, which is the process of any one of the thirty-fifth through the thirty-seventh aspects, wherein an ethylene to propylene weight ratio is increased by equal to or greater than about 10% when compared to an ethylene to propylene weight ratio in an otherwise similar process that lacks the steps of (i) feeding at least a portion of the hydrogenation product stream and hydrogen to a hydrocracking reactor to produce a hydrocracking product stream; and (ii) recycling at least a portion of the hydrocracking product stream and at least a portion of the saturated gas stream to the liquid steam cracker furnace section.

While embodiments of the disclosure have been shown and described, modifications thereof can be made without departing from the spirit and teachings of the invention. The embodiments and examples described herein are exemplary only, and are not intended to be limiting. Many variations and modifications of the invention disclosed herein are possible and are within the scope of the invention.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the detailed description of the present invention. The disclosures of all patents, patent applications, and publications cited herein are hereby incorporated by reference.

What is claimed is:

1. A process for producing olefins comprising:
   (a) introducing a steam cracker feed stream to a liquid steam cracker furnace section to produce a steam cracker product stream, wherein the steam cracker product stream comprises olefins, and wherein an amount of olefins in the steam cracker product stream is greater than an amount of olefins in the steam cracker feed stream;
   (b) separating at least a portion of the steam cracker product stream in a separation section into a hydrogen stream, a methane stream, an olefin gas stream, a saturated gas stream, a hydrocarbons gas stream, an aromatics stream, a raffinate stream, and a heavies stream; wherein the olefin gas stream comprises ethylene and propylene; wherein the saturated gas stream comprises ethane and propane; wherein the hydrocarbons gas stream comprises $C_4$ to $C_5$ hydrocarbons; wherein the aromatics stream comprises $C_6$ to $C_8$ aromatic hydrocarbons; wherein the raffinate stream comprises $C_6$ to $C_8$ non-aromatic hydrocarbons; and wherein the heavies stream comprises $C_{9+}$ hydrocarbons;
   (c) feeding at least a portion of the hydrocarbons gas stream and hydrogen to one or more hydroprocessing reactors to produce a hydrocracking product stream, wherein the hydrocracking product stream comprises ethane and propane; and
   (d) recycling at least a portion of the hydrocracking product stream and at least a portion of the saturated gas stream to the liquid steam cracker furnace section.

2. The process of claim 1, wherein the one or more hydroprocessing reactors comprise a hydrocracking reactor, and wherein the hydrocracking reactor comprises a hydrocracking catalyst.

3. The process of claim 2, wherein the hydrocracking reactor is characterized by a temperature of from about 350° C. to about 600° C.; a pressure of from about 100 psig to about 400 psig; a weight hourly space velocity (WHSV) of from about 1 h$^{-1}$ to about 50 h$^{-1}$; and a hydrogen to hydrocarbon molar ratio of from about 5:1 to about 1:0.5.

4. The process of claim 2, wherein the hydrocracking catalyst comprises a metal on a support, wherein the metal comprises Pd, Pt, Ni, Co, Mn, Fe, Rh, Ir, Ru, W, Zr, or combinations thereof; and wherein the support comprises a zeolite, ZSM-5, zeolite Y, mordenite, zeolite L, ZSM-22, ZSM-11, chabazite, ferrierite, zeolite beta, silated ZSM-5, zirconia, sulfated zirconia, alumina, or combinations thereof.

5. The process of claim 2, wherein the one or more hydroprocessing reactors further comprise a hydrogenation reactor, wherein the hydrogenation reactor comprises a hydroprocessing catalyst; and wherein the hydroprocessing catalyst comprises Pt on an alumina support, Pd on an alumina support, Ni on an alumina support, Co—Mo on an alumina support, or combinations thereof.

6. The process of claim 5, wherein the hydrogenation reactor is characterized by a temperature of from about 60° C. to about 300° C.; a pressure of from about 350 psig to about 600 psig; and a liquid hourly space velocity (LHSV) of from about 1 h$^{-1}$ to about 10 h$^{-1}$.

7. The process of claim 1, wherein the one or more hydroprocessing reactors comprise from about 2 to about 10 hydrocracking reactors in series; wherein at least one of the hydrocracking reactors in series comprises a cooling unit downstream of the hydrocracking reactor, and wherein the cooling unit decreases a temperature of the hydrocracking product stream.

8. The process of claim 1, wherein the liquid steam cracker furnace section comprises a first cracking zone and a second cracking zone, wherein the first cracking zone is characterized by an ethane cracking temperature, wherein the second cracking zone is characterized by a propane cracking temperature, and wherein the ethane cracking temperature is greater than the propane cracking temperature.

9. The process of claim 8 further comprising feeding at least a portion of the hydrocracking product stream and/or at least a portion of the saturated gas stream to the first cracking zone.

10. The process of claim 8 further comprising separating at least a portion of the hydrocracking product stream and/or at least a portion of the saturated gas stream into an ethane stream and a propane stream.

11. The process of claim 10 further comprising (i) feeding at least a portion of the ethane stream to the first cracking zone, and (ii) feeding at least a portion of the propane stream to the second cracking zone.

12. The process of claim 1, wherein the hydrocracking product stream further comprises $C_4$ to $C_5$ hydrocarbons; wherein an amount of $C_4$ to $C_5$ hydrocarbons in the hydrocracking product stream is less than an amount of $C_4$ to $C_5$ hydrocarbons in the hydrocarbons gas stream; and wherein step (d) further comprises separating at least a portion of the $C_4$ to $C_5$ hydrocarbons from the hydrocracking product stream prior to recycling at least a portion of the hydrocracking product stream to the liquid steam cracker furnace section.

13. The process of claim 12 further comprising recycling at least a portion of the separated $C_4$ to $C_5$ hydrocarbons to the one or more hydroprocessing reactors.

14. The process of claim 1 further comprising introducing at least a portion of the hydrogen stream to the one or more hydroprocessing reactors.

15. The process of claim 1 further comprising introducing at least a portion of the raffinate stream to the one or more hydroprocessing reactors.

16. The process of claim 1, wherein an ethylene to propylene weight ratio is increased by equal to or greater than about 10% when compared to an ethylene to propylene weight ratio in an otherwise similar process that lacks the steps of (i) feeding at least a portion of the hydrocarbons gas stream and hydrogen to one or more hydroprocessing reactors to produce a hydrocracking product stream; and (ii) recycling at least a portion of the hydrocracking product stream and at least a portion of the saturated gas stream to the liquid steam cracker furnace section.

17. The process of claim 1 wherein an ethylene to propylene weight ratio is equal to or greater than about 3:1.

18. The process of claim 1 further comprising separating at least a portion of the aromatics stream into a $C_6$ aromatics stream, a $C_7$ aromatics stream, and a $C_8$ aromatics stream, wherein the $C_6$ aromatics stream comprises benzene, wherein the $C_7$ aromatics stream comprises toluene, and wherein the $C_8$ aromatics stream comprises xylenes and ethylbenzene.

19. A process for producing olefins comprising:
   (a) introducing a steam cracker feed stream to a liquid steam cracker furnace section to produce a steam cracker product stream, wherein the steam cracker product stream comprises olefins, and wherein an amount of olefins in the steam cracker product stream is greater than an amount of olefins in the steam cracker feed stream;

(b) separating at least a portion of the steam cracker product stream into a hydrogen stream, a methane stream, an olefin gas stream, a saturated gas stream, a hydrocarbons gas stream, an aromatics stream, a raffinate stream, and a heavies stream; wherein the olefin gas stream comprises ethylene and propylene; wherein the saturated gas stream comprises ethane and propane; wherein the hydrocarbons gas stream comprises $C_4$ to $C_5$ hydrocarbons; wherein the aromatics stream comprises $C_6$ to $C_8$ aromatic hydrocarbons; wherein the raffinate stream comprises $C_6$ to $C_8$ non-aromatic hydrocarbons; and wherein the heavies stream comprises $C_{9+}$ hydrocarbons;

(c) feeding at least a portion of the hydrocarbons gas stream and at least a portion of the raffinate stream, and hydrogen to a hydrogenation reactor to produce a hydrogenation product stream, wherein the hydrogenation reactor comprises a hydroprocessing catalyst, wherein the hydrogenation product stream comprises $C_4$ to $C_8$ saturated hydrocarbons, and wherein an amount of $C_4$ to $C_8$ saturated hydrocarbons in the hydrogenation product stream is greater than an amount of $C_4$ to $C_8$ saturated hydrocarbons in the hydrocarbons gas stream and the raffinate stream;

(d) feeding at least a portion of the hydrogenation product stream and hydrogen to a hydrocracking reactor to produce a hydrocracking product stream, wherein the hydrocracking reactor comprises a hydrocracking catalyst, wherein the hydrocracking catalyst comprises a metal on a support, wherein the metal comprises Pd, Pt, Ni, Co, Mn, Fe, Rh, Ir, Ru, W, Zr, or combinations thereof, and wherein the hydrocracking product stream comprises ethane and propane; and (e) recycling at least a portion of the hydrocracking product stream and at least a portion of the saturated gas stream to the liquid steam cracker furnace section.

20. The process of claim 19, wherein an ethylene to propylene weight ratio is equal to or greater than about 3:1.

* * * * *